No. 661,502. Patented Nov. 13, 1900.
G. C. DITZLER.
SEED DRILL.
(Application filed June 8, 1900.)
(No Model.) 2 Sheets—Sheet 1.

Witnesses
Howard D. Orr
J. W. Garner

G. C. Ditzler, Inventor
by C. A. Snow & Co.
Attorneys

THE NORRIS PETERS CO., PHOTO-LITHO., WASHINGTON, D. C.

No. 661,502. Patented Nov. 13, 1900.
G. C. DITZLER.
SEED DRILL.
(Application filed June 8, 1900.)
(No Model.) 2 Sheets—Sheet 2.
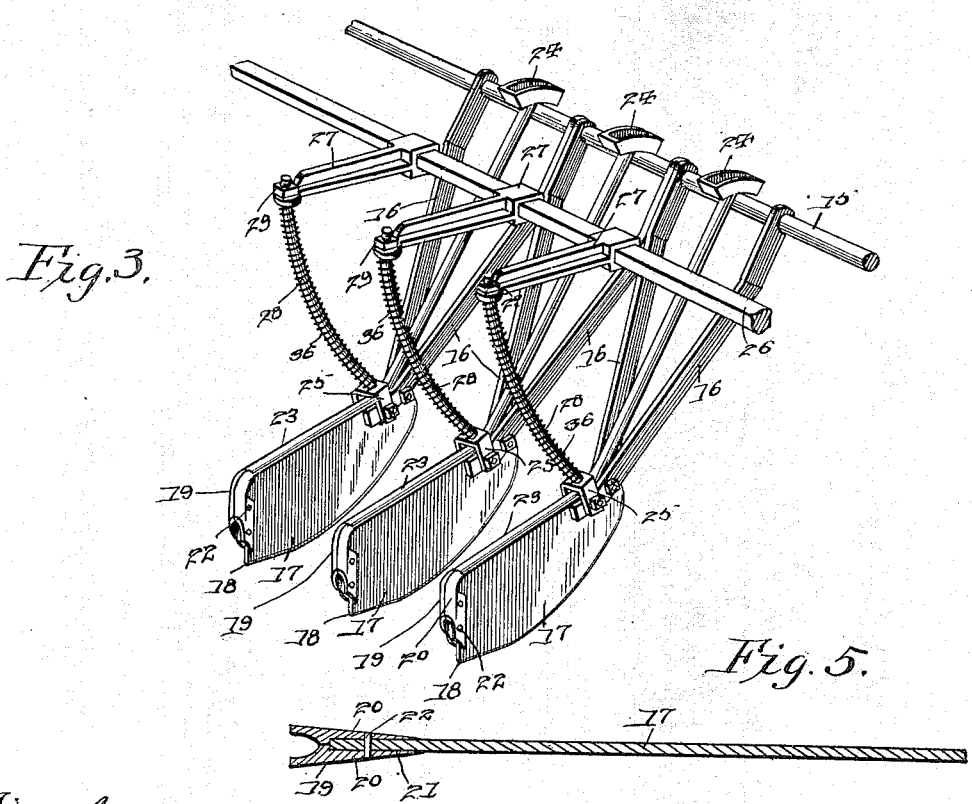
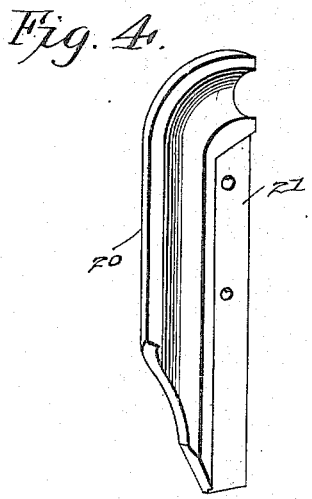
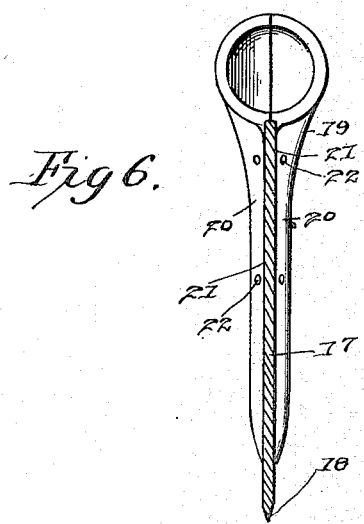
Witnesses
Howard D. Orr.
J. W. Garner
G. C. Ditzler, Inventor
By C. A. Snow & Co.
Attorneys

UNITED STATES PATENT OFFICE.

GEORGE C. DITZLER, OF UNIONDALE, INDIANA.

SEED-DRILL.

SPECIFICATION forming part of Letters Patent No. 661,502, dated November 13, 1900.

Application filed June 8, 1900. Serial No. 19,572. (No model.)

*To all whom it may concern:*

Be it known that I, GEORGE C. DITZLER, a citizen of the United States, residing at Uniondale, in the county of Wells and State of Indiana, have invented a new and useful Seed-Drill, of which the following is a specification.

My invention is an improved seed-drill, especially adapted for drilling grass and clover seed in sod and in growing grain, such as wheat and rye.

The object of my invention is to provide a seed-drill which is adapted to cut furrows in sod and in land covered with growing grain, such as wheat and rye, and to drill grass or clover seed in said sod or grain land without injuring the sod or grain.

My invention consists in the peculiar construction and combination of devices hereinafter fully set forth, and pointed out in the claims.

Figure 1:
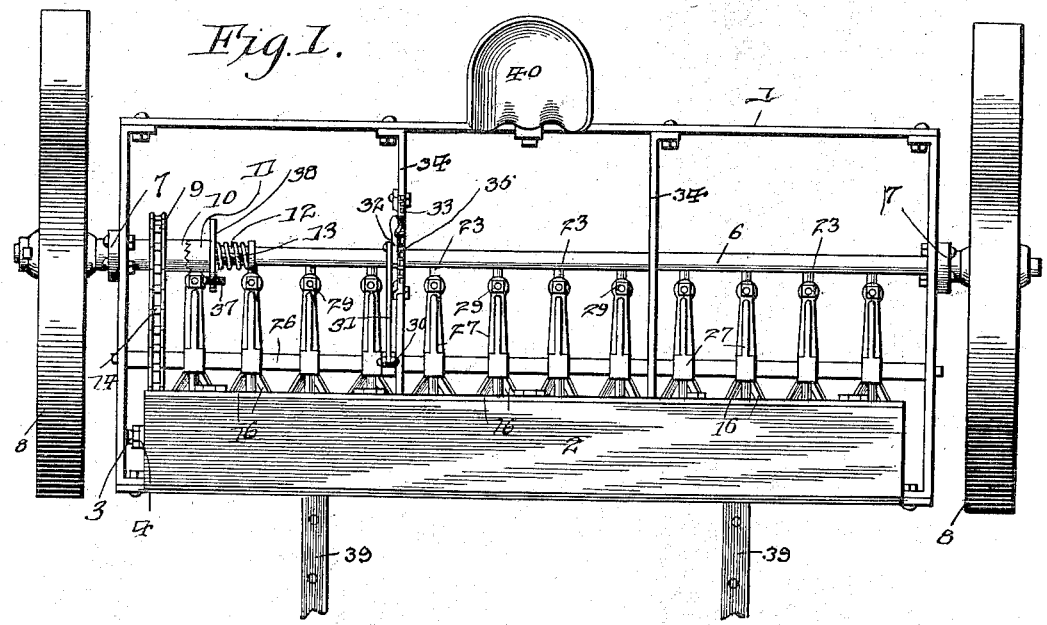
Figure 2:
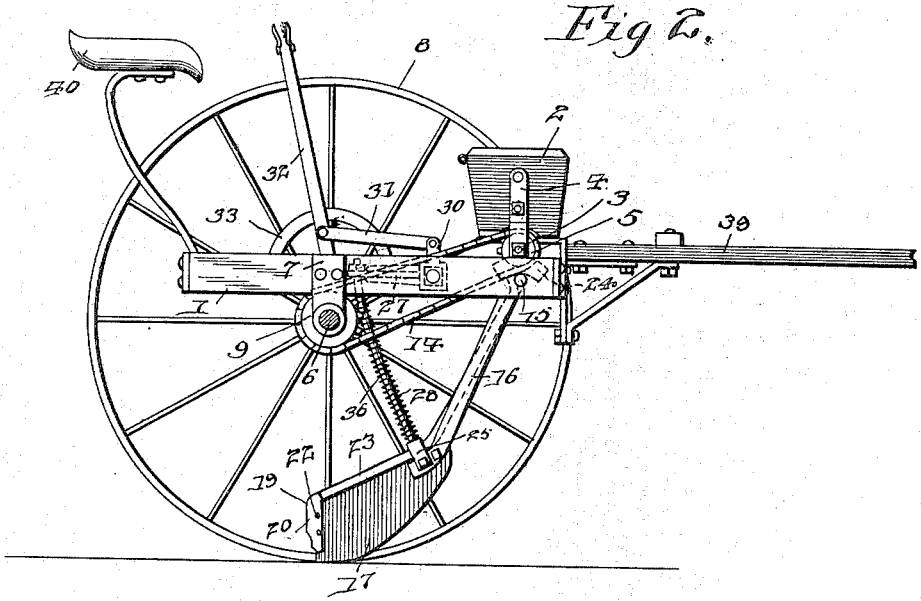

In the accompanying drawings, Figure 1 is a top plan view of a seed-drill embodying my improvements. Fig. 2 is a side elevation of the same with the rear wheel removed. Fig. 3 is a detail perspective view of a number of my improved furrowing-shares. Fig. 4 is a detail perspective view of a portion of the drill-tube on the rear end of the furrowing-share. Figs. 5 and 6 are detail views of one of the furrowing-shares.

The frame 1 of the drill, which is preferably rectangular in form, is provided on its front side with a seed box or hopper 2, in the bottom of which is suitable force-feed seed mechanism of the usual construction operated by the revoluble shaft 3, which has its bearings in bracket-plates 4, secured on the ends of the seedbox and depending therefrom. The said shaft 3 is provided at one end with a sprocket-wheel 5.

An axle-shaft 6 is journaled in bearings 7 in the sides of the frame 1 at a suitable distance from the rear end thereof, and on the said axle-shaft are mounted the driving and supporting wheels 8, one of which is fast to the said shaft and the other of which is loose thereon. The axle-shaft is provided with a sprocket-wheel 9, which is loosely mounted thereon and is provided with a clutch member 10. A clutch member 11 is splined on said axle-shaft, as at 12, and by the action of a spring 13 is kept normally in engagement with the clutch member 10, thereby locking the sprocket-wheel 9 to said axle-shaft. An endless sprocket-chain 14 connects the sprocket-wheels 3 and 9.

A supporting-rod 15 is disposed transversely in the frame 1 near the front end thereof, and to the said supporting-rod are pivoted the supporting-arms or draw-bars 16 of a series of furrowing-shares 17, the said supporting-arms serving to trail said furrowing-shares under the machine-frame. Each furrowing-share 17 is a blade preferably of the form here shown and has its lower curved edge sharpened, as at 18, and when attached in operative position to a seed-drilling machine is disposed longitudinally in the line of draft and in an upright position in cross-section, as here shown. The cutting edge of the furrowing-share is on the lower side thereof, and as the share is drawn on the ground by the drilling-machine the furrowing-share is adapted to cut a narrow furrow in the ground of the depth of a few inches (say from one to three or more inches) appropriate for the germination of grass or clover seed in said furrow. Vertically disposed on the rear end of each furrowing opening-share is a section of a drill-tube 19, composed of the separable members 20, having the countersunk recesses 21 on their inner sides to receive the furrowing-share, the said separable sections being secured to said furrowing-share and with their opposing faces in contact with each other by means of bolts or rivets, as at 22. Seed-tubes 23 extend from receiving-cups 24 on the rod 15 and disposed under the force-feed seed mechanism to the drill-tubes 19. The said seed-tubes are supported and secured on the upper edges of the furrowing-shares by means of keepers 25, as shown. It will be understood that the seed-tubes and drill-tubes convey the seeds from the force-feed seed mechanism to the rear ends of the furrowing opening-shares and discharge the seeds into the furrows opened by the said shares when the machine is in operation.

It will be observed by reference to Fig. 5 of the drawings that the sides of the drill-tube converge forwardly, the drill-tube being wedge-shaped in horizontal section and adapted to widen the upper portion of the furrow cut by the blade.

A rock-shaft 26 is disposed at a suitable distance in rear of the rod 15 and is journaled in the sides of the frame 1. A series of rock-arms 27 are secured on said rock-shaft, and each of the said rock-arms is connected to one of the furrowing opening-shares by a link-rod 28. The lower ends of the said link-rods are secured to the keepers 25, which are pivoted to the furrow-opening shares, as shown, and the upper ends of the link-rods are adapted to operate in openings in the rear ends of the rock-arms, and said link-rods are provided with taps or nuts 29, which bear upon the upper sides of the rock-arms and connect said link-rods to the said rock-arms, while permitting said link-rods to move upwardly through the openings in the rock-arms independently of the latter. By this construction and arrangement of devices each of the furrowing-shares, with its drill-tube, is adapted for vertical movement independently of the others, and is hence enabled to ride over stones and other obstructions which may encounter it and avoid danger of being injured thereby. It will be further understood that by turning the rock-shaft through a partial revolution the furrowing-shares may be simultaneously raised or lowered. The said rock-shaft is provided with an arm 30, which is connected by a link 31 to a hand-lever 32, which is fulcrumed to a segment-plate 33, secured on one of the longitudinally-disposed cross-bars 34 of frame 1. The said hand-lever has the usual detent 35 to engage the rack-plate and lock said lever at any desired adjustment. On each of the link-rods 28 is a coiled tension-spring 36, the said springs bearing between the keepers 25 at the lower ends of said link-rod and the under sides of the rock-arms 27. The function of the said springs is to normally depress the furrowing-shares and keep the latter when in operative position in engagement with the ground and force them downward into the soil to the desired depth of the furrow, this being predetermined by adjusting the rock-shaft by means of the hand-lever 32, as will be understood. The said hand-lever being adapted to partly turn the rock-shaft enables the furrow-opening shares to be simultaneously raised and lowered to put the machine in or out of operation. One of the rock-arms 27 is provided with a cam 37, which by engagement with a flange 38, with which the clutch member 11 is provided, when the rock-shaft is turned so as to raise the furrow-opening shares from the ground automatically engages the said flange 38, moves the clutch member 11 out of engagement with the clutch member 10, thereby unlocks the sprocket-wheel 9 from the axle-shaft, and hence throws the seed-feed mechanism out of operation, as will be understood. The frame 1 of the machine is provided with the usual shafts 39 for the attachment of a draft-animal and the usual seat 40 for the driver.

I do not desire to limit myself to the precise construction and combination of devices hereinbefore described, as it is evident that modifications may be made therein without departing from the spirit of my invention.

Having thus described my invention, I claim—

1. In combination with a seed mechanism, a supporting-rod under the same, receiving-cups on said rod, supporting-arms attached to said rod, furrowing shares or cutters attached to said supporting-arms and trailed thereby, said furrowing-shares or cutter-plates having drill-tubes at their rear ends, and seed-tubes connecting the said receiving-cups to said drill-tubes, substantially as described.

2. The combination with a seed mechanism having an operating-shaft, a power-shaft, connections between said operating and power shafts whereby the former is driven by the latter, said connections including a clutch, supporting-arms, furrowing-shares or cutter-plates attached to said supporting-arms and trailed thereby, said furrowing-shares or cutter-plates having drill-tubes at their rear ends, tubes to conduct seed from the seed mechanism to said drill-tubes, a rock-shaft having rock-arms, connections between said rock-arms and said furrowing-shares or cutter-plates to raise and lower the latter, a lever to operate said rock-shaft, and one of said rock-arms having a cam to automatically operate the clutch when said rock-shaft is caused to raise said furrowing-shares, or cutter-plates, for the purpose set forth, substantially as described.

3. In a seed-drill of the class described, in combination with a seed mechanism, a supporting-rod disposed under the same, receiving-cups on said rod, supporting-arms attached to said supporting-rod, furrowing-shares or cutter-plates attached to and trailed by said supporting-arms, said furrowing-shares or cutter-plates having drill-tubes at their rear ends, seed-tubes connecting said drill-tubes to said receiving-cups, a rock-shaft having rock-arms, rods connecting said furrowing-shares or cutter-plates to said rock-arms and adapted to move upward in the latter, a lever to operate said rock-shaft and springs bearing downward on said furrowing-shares or cutter-plates, substantially as described.

4. A furrowing-share comprising the flat, parallel-sided blade 17, the drill-tube 19 secured on the rear end thereof, projecting rearwardly therefrom and comprising the separable members 20 secured on opposite sides of said blade and countersunk to receive the same, and the seed-tube disposed on the upper side of the blade and discharging into the upper end of said drill-tube.

5. A furrowing-share comprising the flat parallel-sided blade 17, the drill-tube 19, disposed vertically on the rear end thereof, projecting rearwardly therefrom, overlapping the sides of the said blade, and wedge-shaped in horizontal section and adapted to widen the upper portion of the furrow cut by said blade, and a seed-tube discharging into the said drill-tube, substantially as described.

In testimony that I claim the foregoing as my own I have hereto affixed my signature in the presence of two witnesses.

GEORGE C. DITZLER.

Witnesses:
AUGUSTUS W. MARTIN,
JOHN H. ORMSBY.